(12) United States Patent
Park et al.

(10) Patent No.: US 6,460,180 B1
(45) Date of Patent: Oct. 1, 2002

(54) ENABLING AND/OR DISABLING SELECTED TYPES OF BROADCAST TRIGGERS

(75) Inventors: Timothy F. Park, Menlo Park, CA (US); Dean J. Blackketter, San Francisco, CA (US); Sandra R. Bernardi, Los Altos Hills, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/295,746

(22) Filed: Apr. 20, 1999

(51) Int. Cl.$^7$ .......................... H04N 5/445; H04N 7/16; H04N 7/173; G06F 3/00; G06F 13/00
(52) U.S. Cl. .......................... 725/40; 725/51; 725/135; 725/139; 725/110; 725/60; 725/39
(58) Field of Search ............................. 725/20–40, 51, 725/60–64, 65, 66, 68, 71, 110, 112, 114, 116, 122, 136–139, 146, 141, 134, 135, 105; 709/235–236, 219; 370/252; 348/553

(56) References Cited

U.S. PATENT DOCUMENTS

| | | | | |
|---|---|---|---|---|
| 5,485,553 A | * | 1/1996 | Kovalick et al. | 358/1.6 |
| 5,528,490 A | | 6/1996 | Hill | 364/403 |
| 5,600,632 A | * | 2/1997 | Schulman | 370/252 |
| 5,857,190 A | * | 1/1999 | Brown | 707/10 |
| 5,862,220 A | | 1/1999 | Perlman | 380/21 |
| 5,931,908 A | * | 8/1999 | Gerba et al. | 709/219 |
| 5,937,331 A | * | 8/1999 | Kalluri et al. | 725/146 |
| 6,006,256 A | * | 12/1999 | Zdepski et al. | 725/114 |
| 6,018,764 A | * | 1/2000 | Field et al. | 146/217 |
| 6,049,831 A | * | 4/2000 | Gardell et al. | 709/236 |
| 6,078,961 A | * | 6/2000 | Mourad et al. | 709/235 |
| 6,198,511 B1 | * | 3/2001 | Matz et al. | 348/553 |
| 6,240,555 B1 | * | 5/2001 | Shoff et al. | 725/110 |

FOREIGN PATENT DOCUMENTS

| | | | | |
|---|---|---|---|---|
| EP | 0849946 | * | 6/1998 | H04N/7/08 |
| GB | 0942595 A2 | * | 9/1999 | H04N/5/00 |
| WO | WO 98/41020 | | 9/1998 | |

OTHER PUBLICATIONS

U.S. patent application Ser. No. 09/087,354, filed May 29, 1998.
U.S. patent application Ser. No. 09/099,481, filed Jun. 17, 1998.
U.S. patent application Ser. No. 09/153,577, filed Sep. 15, 1998.
Electronic Industries Association EIA–746A, pre–publication Version, Revision 1, version 5, 11 pages (Apr. 26, 1998).

(List continued on next page.)

*Primary Examiner*—Andrew Faile
*Assistant Examiner*—Hai V. Tran
(74) *Attorney, Agent, or Firm*—Workman, Nydegger, Seeley (57) ABSTRACT

Information from an information resource may be displayed with television video in a synchronized fashion. A trigger, broadcast along with the television video, identifies the resource and indicates how information from the resource should display. When a trigger is received, the receiver unit determines whether a rule stored in the receiver unit applies to the trigger. For example, if the rule applies, the receiver unit may take a predetermined action, or if the rule does not apply, the rule may have no effect and the receiver unit may act upon the trigger in a normal or default fashion. Based on one or more rules, the receiver unit may ignore certain triggers, but not others. Rules can be automatically loaded into the receiver unit on power-up by one-way broadcast communication, from a permanent storage device, or by downloading from the Internet. The rules can be updated periodically.

40 Claims, 6 Drawing Sheets

OTHER PUBLICATIONS

Electronic Industries Association EIA–516, "Joint EIA/CVCC Recommended Practice for Teletext: North American Basic Teletext Specification (NABTS)", 89 pages (May 1988).

Advanced Television Enhancement Forum Specification (ATVEF), comment draft Version 1.0, Revision 1, 19 pages (Aug. 1998).

Advanced Television Enhancement Forum Specification (ATVEF), Draft Version 1.1, Revision 19, 32 pages (Aug. 1998).

Preston Gralla, "How The Internet Works", special edition, pp. 66, 67, 142, 143, 150, 151, 260, 261, 278 and 279 (1997).

Intel Intercast website, "How Does It Work", pages from www.intercast.com, 8 pages (Jan. 29, 1999).

U.S. patent application Ser. No. 09/099,118, D. Zigmond, filed Jun. 17, 1998.

Electronic Industries Association EIA–746A, "Transport of Internet Uniform Resource Locator (URL) Information Usage Text–2 (T–2) Service" (Sep. 1998).

Request For Comments (RFC) 791, "Internet Protocol, DARPA Internet Program Protocol Specification," Sep. 1981.

Electronic Industries Association EIA–608, "Recommended Practice for Line 21 Data Service" (Sep. 1994).

Advanced Television Enhancement Forum Specification (ATVEF), Version 1.1 revision 26, (Feb. 2, 1999).

R. Panabaker, S. Wegerif, and D. Zigmond, "The Transmission of IP Over the Vertical Blanking Interval of a Television Signal," (Feb. 1999).

* cited by examiner

ENABLING AND/OR DISABLING SELECTED TYPES OF BROADCAST TRIGGERS

BACKGROUND INFORMATION

Figure 1:
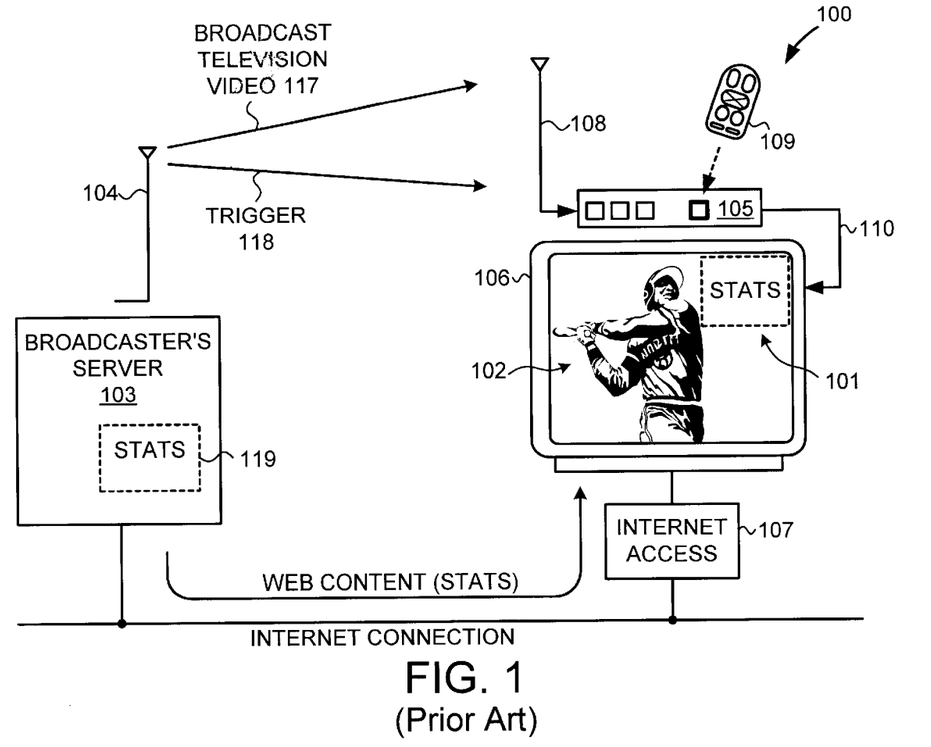
FIG. 1 (Prior Art) is a simplified diagram of an interactive television system employing triggers.

FIG. 1 (Prior Art) is a diagram of an interactive television system 100 that enhances a television viewing experience by integrating television programming with content from the Internet. The broadcast of a baseball game can, for example, be enhanced by retrieving relevant information (for example, a batter's batting statistics 101) from the Internet and displaying that information at an appropriate point in the baseball game (for example, when the batter 102 is batting).

System 100 includes a server 103 maintained by the broadcaster, a broadcasting antenna 104, a receiver unit 105, a television set 106, and an Internet access point 107. Receiver unit 105 includes a receiving antenna 108 and a remote control unit 109. A viewer uses remote control unit 109 to control the receiver unit and/or to interact with interactive television content via the receiver unit. A video link 110 couples receiver unit 105 to television set 106 so that the receiver unit can use the television set as a display device.

Figure 2:
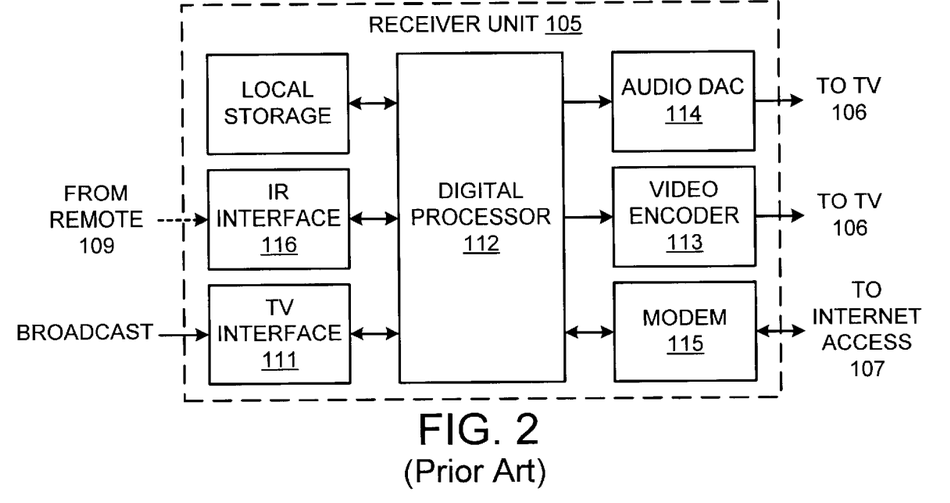
FIG. 2 (Prior Art) is a block diagram of the receiver unit 105 of the system of FIG. 1.

FIG. 2 is a block diagram of receiver unit 105. TV interface circuitry 111 of the receiver unit 105 includes a tuner that is tuned to receive the broadcast television video and to remove a television carrier signal. After the carrier signal is removed, TV interface circuitry 111 digitizes the resulting video signal. Software executed by a digital processor 112 receives the digitized signal from TV interface 111 and decodes and checks the digitized signal for errors. Receiver unit 105 drives the television set 106 via video encoder 113 and audio digital-to-analog converter 114. Digital processor 112 realizes a type of web browser that can access the Internet via a modem 115. Receiver unit 105 includes an infrared interface 116 for receiving infrared transmissions from remote control unit 109.

To enhance the baseball game by the display of batter statistics 101, television video 117 is broadcast over the airwaves from broadcasting antenna 104 to receiving antenna 108 of receiver unit 105. At an appropriate time in the baseball game when the broadcaster wishes batter statistics 101 to be displayed (for example, when batter 102 appears on the television screen), the broadcaster broadcasts a trigger 118 along with the television video 117. Trigger 118 contains a Uniform Resource Locator (URL) that identifies an information resource 119 on the broadcaster's server 103. In this case, information resource 119 is a web page containing the batter's statistics.

Receiver unit 105 receives trigger 118, accesses the Internet via Internet access point 107, uses the URL from the trigger to retrieve the web page of batter statistics from server 103, and then displays the batter statistics 101. In this way, broadcasters use triggers to have their viewers' receiver units retrieve information from the Internet and display that information in concert with their programming.

A service company may, for a fee, provide receiver units and Internet access to individual viewers. The service company may not be an Internet Service Provider (ISP) that maintains the Internet access point. Rather, the service company contracts with an ISP and then resells the Internet access to individual viewers. The service company may pay the ISP for the Internet activity of its viewers by the connect-hour. The service company therefore has an interest in controlling the magnitude of Internet accessing so that it can keep associated costs from exceeding the amount it bills its individual viewers.

As seen from the illustration of FIG. 1, a broadcaster that transmits an unduly large number of triggers could cause the service company to incur large charges from the ISP. A means of controlling such costs and inducing broadcasters to reimburse the service company for costs associated with their transmissions is desired.

SUMMARY

In interactive television, information from an information resource may be displayed along with television video in a synchronized fashion. When information is to be displayed at a point in the television video, a trigger is broadcast along with the television video. The trigger identifies the information resource and indicates how information from the information resource is to be displayed. Some triggers are ignored in accordance with the invention whereas other such triggers are not ignored. When the receiver unit receives a trigger, the receiver unit determines whether a rule stored in the receiver unit applies to the trigger. If the rule applies, then the receiver unit takes a predetermined action. If the rule does not apply, then the rule has no effect and the trigger is acted upon by the receiver unit in normal fashion (a default trigger handling condition). In one embodiment, the predetermined action is to ignore the trigger. By including one or more such rules in a receiver unit, the receiver unit is made to ignore certain specific types of triggers but not to ignore other types of triggers. The rules can be automatically loaded into the receiver unit on power-up by broadcast communication over the airwaves, from a permanent storage device (coupled to or a part of) the receiver unit, or by downloading from the Internet. The rules can be updated periodically.

A service company can cause receiver units to ignore certain types of triggers by causing the receiver units to load particular lists of rules. Accordingly, triggers from a particular broadcaster that does not reimburse the service company for costs associated with supporting the triggers can be disabled. It is therefore believed that a service company's capability to disable particular triggers may help induce broadcasters to reimburse service companies for Internet access costs associated with supporting the broadcaster's triggers.

Other methods and structures are disclosed in the detailed description below. This summary does not purport to define the invention. The invention is defined by the claims.

DETAILED DESCRIPTION

Figure 3:
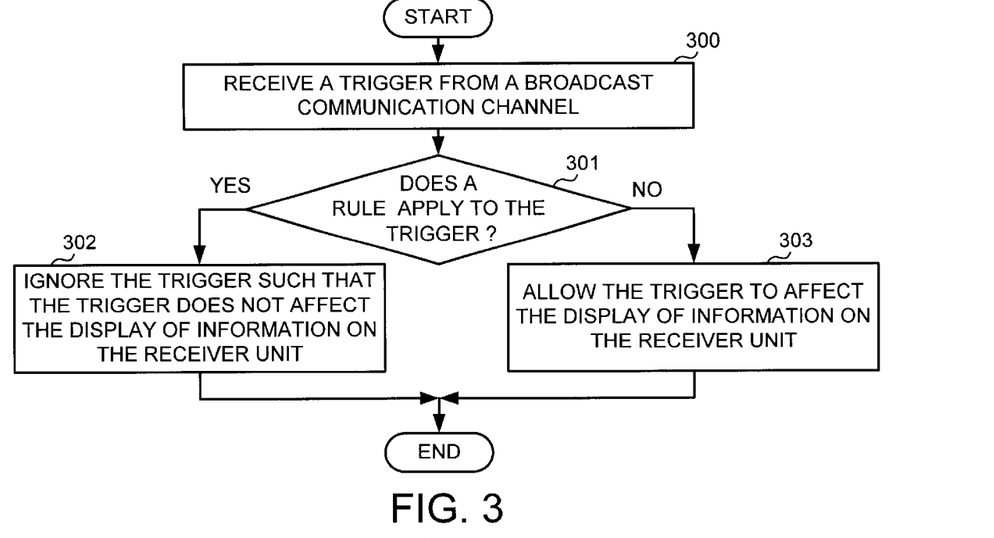
FIG. 3 is a flowchart of a method in accordance with an embodiment of the present invention.

FIG. 3 is a flowchart of a method in accordance with an embodiment of the present invention. First (step 300), a receiver unit receives a trigger from a broadcast communication channel. The trigger has correct trigger syntax. The broadcast communication channel can, for example, be a television channel over which a television (audio and video) signal is broadcast. The television signal can, for example, be transmitted over the airwaves, via satellite, or through a cable television fiber optic or coaxial connection.

The receiver unit then (step 301) makes a determination whether a rule present in the receiver unit applies to the trigger. The rule may, for example, contain a string of characters which if present in the trigger indicates that the rule applies to the trigger. If the rule is determined to apply to the trigger, then the receiver unit ignores (step 302) the trigger in the sense that the trigger does not affect a display of information on the receiver unit. If, on the other hand, no rule is determined to apply to the trigger, then the trigger is handled in accordance with a default trigger handling condition. In this example, the default trigger handling condition is to allow the trigger (step 303) to affect the display of information on the receiver unit. A trigger may affect the display of information indirectly by reconfiguring or manipulating functionality of the receiver unit that later affects the display of information. The trigger may contain a script that that is executed on the receiver unit.

Figure 4:
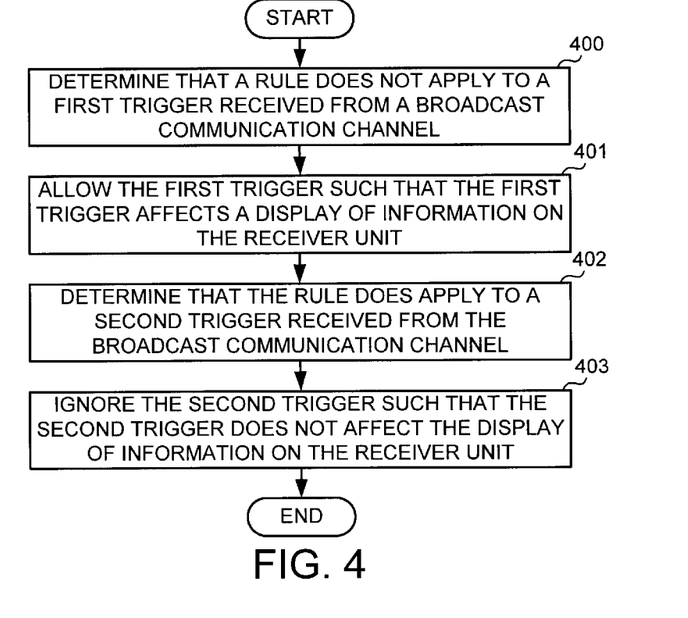
FIG. 4 is a flowchart of a method in accordance with another embodiment.

FIG. 4 is a flowchart illustrating a situation wherein two triggers are received on a receiver unit, the rule applying to one of the triggers but not to the other. Both triggers have correct trigger syntax. First (step 400), the receiver unit determines that a rule does not apply to a first trigger received from a broadcast communication channel. The rule may be determined not to apply to the first trigger, for example, because a string in the rule is not found in the first trigger. Next (step 401), the receiver unit accepts the first trigger such that the first trigger affects a display of information on the receiver unit. The first trigger may, for example, cause web content (for example, an HTML or an XML web page) to be displayed on a screen of the receiver unit along with television video. Next (step 402), the receiver unit determines that the rule does apply to a second trigger received from the broadcast communication channel. The rule may be determined to apply to the second trigger, for example, because a string in the rule is found in the second trigger. Next (step 403), the receiver unit ignores the second trigger in the sense that the second trigger does not affect the display of information on the receiver unit. The rule is therefore used by the receiver unit to filter triggers such that triggers to which the rule applies are ignored.

Figure 5:
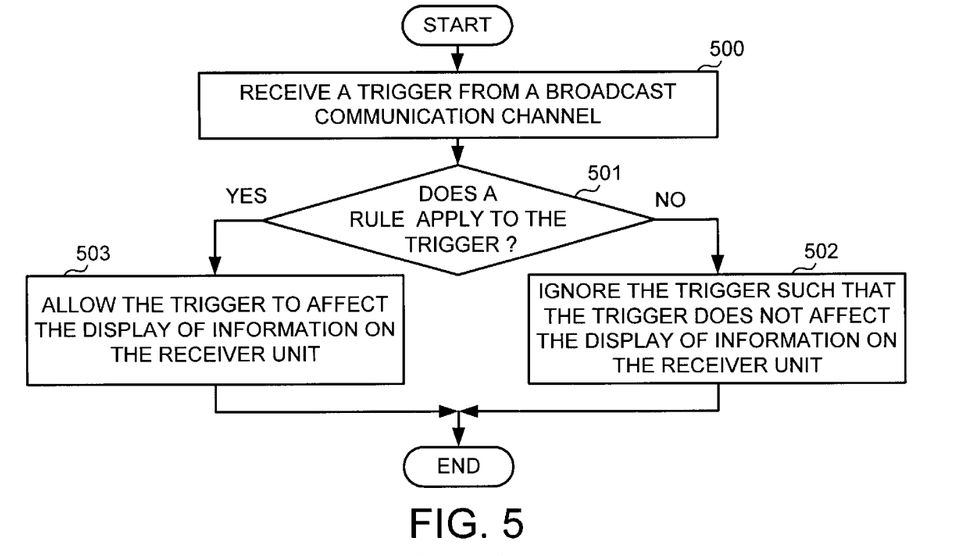
FIG. 5 is a flowchart of a method in accordance with another embodiment.

FIG. 5 is a flowchart of a method in accordance with another embodiment of the present invention. First (step 500), a receiver unit receives a trigger from a broadcast communication channel. The trigger has correct trigger syntax. The receiver unit then (step 501) makes a determination whether a rule present in the receiver unit applies to the trigger. If a rule is determined to apply to the trigger, then the receiver unit allows the trigger (step 503) in the sense that the trigger affects the display of information on the receiver unit. If, on the other hand, no rule is determined to apply to the trigger, then the trigger is handled in accordance with a default trigger handling condition. In the example, the default trigger. handling condition is to ignore the trigger (step 502) such that the trigger does not affect the display of information on the receiver unit.

Figure 6:
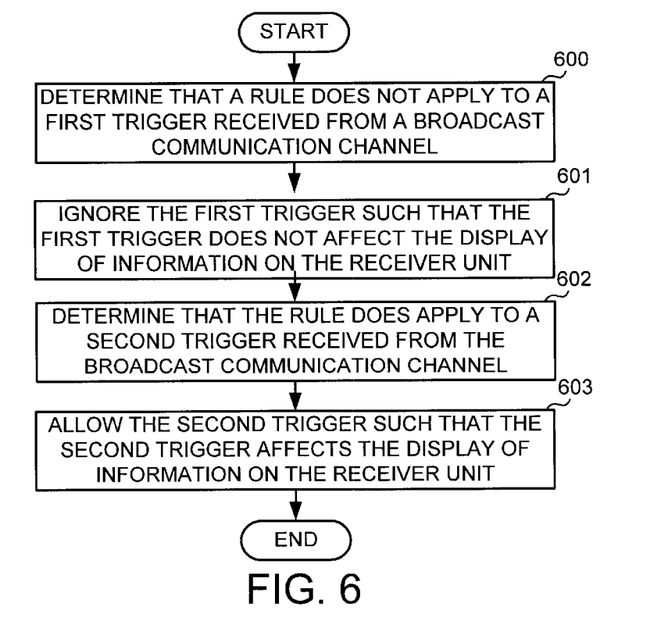
FIG. 6 is a flowchart of a method in accordance with another embodiment.

FIG. 6 is a flowchart illustrating a situation wherein two triggers are received on a receiver unit, the rule applying to one of the triggers but not to the other. Both triggers have correct trigger syntax. First (step 600), the receiver unit determines that a rule does not apply to a first trigger received from a broadcast communication channel. The rule may be determined not to apply to the first trigger, for example, because a string in the rule is not found in the first trigger. The receiver unit ignores the first trigger (step 601) in the sense that the first trigger does not affect the display of information on the receiver unit. Next (step 602), the receiver unit determines that the rule does apply to a second trigger received from the broadcast communication channel. The rule may be determined to apply to the second trigger, for example, because a string in the rule is found in the second trigger. The receiver unit allows the second trigger (step 603) such that the second trigger affects the display of information on the receiver unit.

Figure 7:
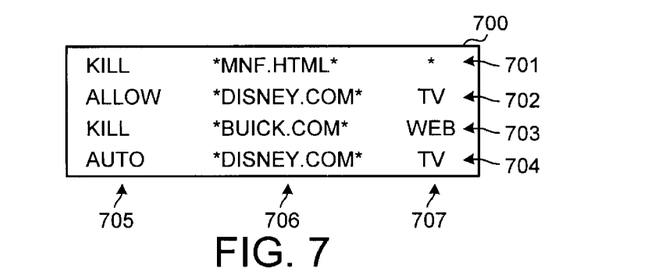
FIG. 7 is a diagram of a list of rules in accordance with an embodiment.

FIG. 7 is an illustration of a list 700 of four rules 701–704 in accordance with another embodiment. Each rule has three fields 705–707. If the first field 705 contains the word "KILL", then the rule is a negative rule in the sense that a trigger to which the rule applies will be ignored. If the first field 705 contains the word "ALLOW", then the rule is a positive rule in the sense that a trigger to which the rule applies will not be ignored but rather will be processed in normal fashion by the receiver unit. In one embodiment, an icon for an enhancement afforded by the trigger appears on the screen of the receiver unit. If the viewer selects the icon using the remote control unit of the receiver unit, then the enhancement will be displayed. If the viewer does not select the icon within a certain amount of time, then the icon disappears and the enhancement is not displayed. There are, however, other triggers called "auto triggers" that cause enhancements to be displayed automatically without the user having to select an icon or take other action. These "auto triggers" are triggers that have an attribute called "AUTO". The default trigger handling condition for auto triggers is to ignore "auto triggers" unless they are enabled in the list of rules. If the first field contains the word "AUTO", then the rule is a positive rule that also allows specified auto triggers.

The second field 706 contains a match requirement. For a rule to apply to a given trigger, the trigger must meet the match requirement. In the example illustrated, the second field 706 contains characters and/or wildcards that define a character string that must be present in the trigger for the rule to apply. The asterisk symbol is a wildcard that represents any one or more characters. Accordingly, the "*MNF-.HTML*" in the second field 706 of rule 701 indicates a trigger containing the character string MNF.HTML, where that character string is both preceded and followed by one or more other characters. In some embodiments, asterisks are assumed to be present both before and after strings in the second field such that the asterisks before and after "MNF-.HTML" would be assumed and need not be included in the rule.

The third field 707 contains another match requirement. For a rule to apply to a trigger, the view attribute value in the third field of the rule must match the view attribute value of the trigger. Possible view attribute values are "TV", "WEB" and the wildcard value asterisk. If an asterisk is present in the third field 707 of a rule, then the trigger need not have any particular view attribute value in order for the rule to apply.

The view attribute value "TV" in a trigger indicates that the trigger is only applicable to receiver unit operation when the receiver unit is displaying television content (either only television content is being displayed or television content with enhancements are being displayed). The view attribute value "WEB", on the other hand, indicates that the trigger is only applicable to receiver unit operation when the receiver unit is displaying only web content (no television content is being displayed). A trigger having the view attribute "WEB" in a trigger, if activated by a viewer, could cause the receiver unit to leave the interactive television mode ("TV" mode) and go into the web only browser mode ("WEB" mode).

Figure 8:
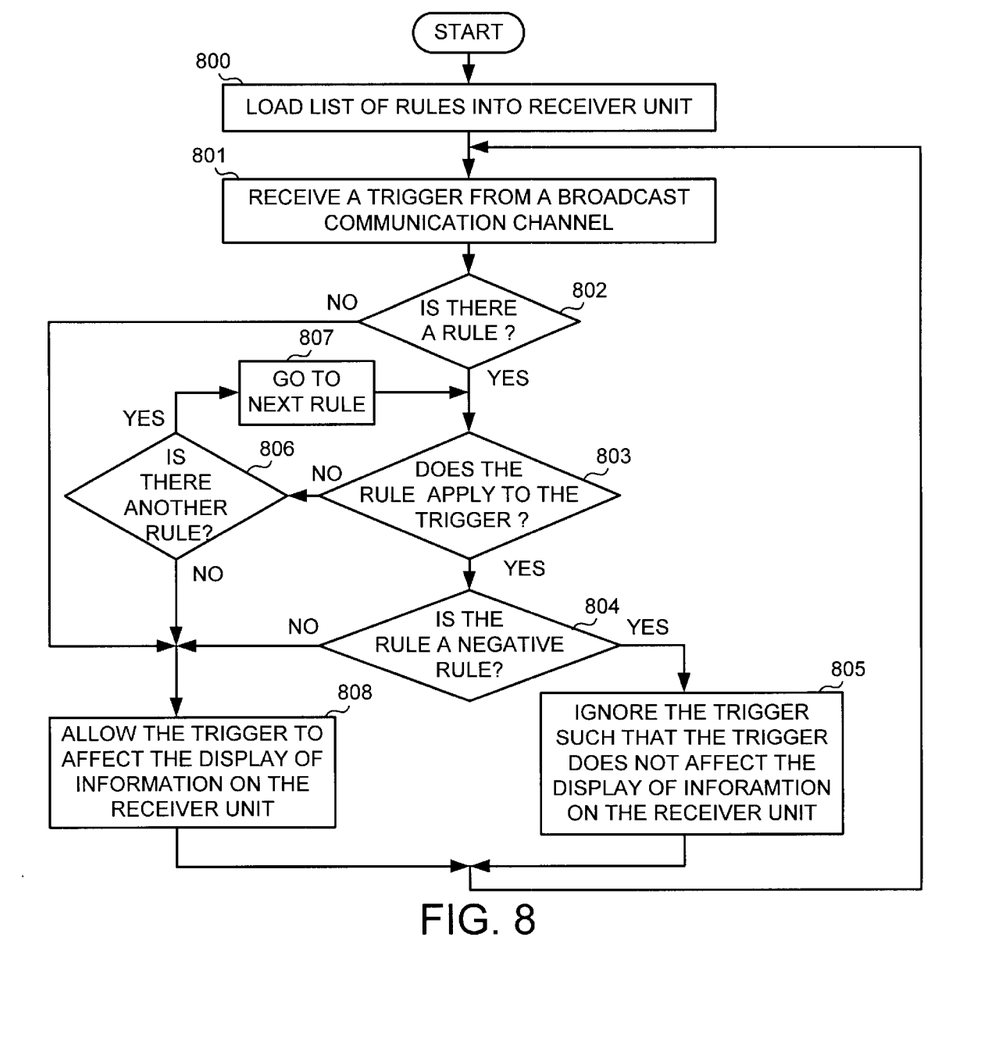
FIG. 8 is a flowchart of a method in accordance with another embodiment.

FIG. 8 is a flowchart of method in accordance with another embodiment. The list 700 of rules 701–704 is first loaded (step 800) into the receiver unit. This list may be loaded into the receiver unit automatically on power-up of the receiver unit or may already be present in memory. The list may be broadcast to the receiver unit (for example, by a one-way broadcast over the airwaves, over a satellite link, or over a cable connection) or may be received by the receiver unit over a packet-switched network (for example, over the Internet). On power-up, if a list of rules is not present or an updated list of rules is available, then the receiver unit may use a modem to establish a dial-up connection to the Internet and retrieve the list of rules from a web page (for example, an HTML or an XML web page). Thus, the receiver unit may update its rules periodically (for example, by receiving a broadcast communication of the rules or by retrieving the rules from a predetermined location on a network). The loading of these rules occurs automatically and is out of the control of the viewer. The rules, once loaded, preferably are not alterable by the viewer.

Next, the receiver unit receives a trigger from a broadcast channel (step 801). In one embodiment, the trigger has proper trigger syntax as set forth in: the "Advanced Television Enhancement Forum Specification (ATVEF)", draft version 1.1, revision 26 (1999); and the "Transport of Internet Uniform Resource Locator (URL) Information Using Text-2 (T-2) Service" standard EIA-746-A (the content of these two documents is incorporated herein by reference). The trigger may contain a script as set forth in U.S. patent application Ser. No. 09/287,985, entitled "Communicating Scripts In A Data Service Channel Of A Video Signal", filed Apr. 7, 1999, by Blackketter et al. (the content of this document is incorporated herein by reference). The trigger may have the following general form including multiple attribute/value pairs:

<http://www.broadcaster.com/program/mnf.html>
 [view:TV][script:_][checksum]

For additional information on triggers containing URLs usable in accordance with some embodiments, see: U.S. patent application Ser. No. 09/099,118, entitled "Communicating Logical Addresses Of Resources In A Data Service Channel Of A Video Signal", filed Jun. 17, 1998, by Daniel J. Zigmond et al. (the content of this document is incorporated herein by reference)

Next (step 802), the receiver unit determines whether there are any rules stored in the receiver unit. If there are no rules (for example, no list was loaded), then the trigger is allowed (step 808). The trigger may, for example, affect the display of information on a screen of the receiver unit.

In one example, a trigger for which no rule applies (for example, because no rules are present in the receiver unit) is treated in accordance with a default trigger handling condition. In the illustrated example of FIG. 8, the default trigger handling condition is to allow triggers. If it is determined there is no rule in step 802, then the trigger is allowed in step 808 and is processed in ordinary fashion by the receiver unit. Other default trigger handling conditions are, however, possible. In one example, a trigger for which no rule applies is ignored. In another example, some triggers for which no rule applies are allowed whereas others are ignored.

If there is a rule in the list of rules (step 802), then the trigger is checked (step 803) against the first rule in the list to determine whether the rule applies to the trigger. In the example of FIG. 7, rule 701 would apply to any trigger that contains the string identified by the *mnf.html* in the second field 706. If rule 701 is determined by the receiver unit to apply to the trigger received in step 801, then processing proceeds to step 804. Because rule 701 is a negative rule, processing proceeds to step 805. The trigger is ignored such that the trigger does not affect the display of information on the receiver unit.

If, on the other hand, the rule is determined not to apply to the trigger in step 803, then rule 701 has no affect. Processing proceeds to step 806 where a determination is made as to whether there is another rule in list 700. Because there is another rule in list 700, processing proceeds to the next rule 702 (step 807).

The trigger received in step 801 is then checked against the second rule 702 (step 803) to determine whether the second rule 702 applies to the trigger. If rule 702 applies, then a determination is made (step 804) whether the rule is a positive rule or a negative rule. Rule 702 is a positive rule as indicated by the "ALLOW" in the first field 705.

Because the default trigger handling condition in this example is to allow triggers, application of such a rule would have no affect other than preventing the trigger from being tested against subsequent rules in the list. If, for example, second rule 702 is determined to apply to the trigger received in step 801, then processing proceeds to step 808, the trigger is allowed, and processing proceeds back to step 801 without the trigger being tested against the last two rules 703 and 704 of the list 700. It is therefore seen that including a positive rule in the list where the default trigger handling condition is to allow triggers provides a way of having certain types of triggers not be tested against subsequent rules.

If second rule 702 does not apply to the trigger received in step 801, then processing proceeds to step 806 and step 807 and the trigger is checked against the third rule 703 in step 803. If the third rule 703 is determined to apply to the trigger, then the trigger is ignored in step 805 and processing proceeds back to step 801. If, on the other hand, the third rule 703 is determined not to apply, then processing proceeds through steps 806 and 807 and the trigger is checked against the fourth rule 704.

If fourth rule 704 applies, then the trigger is an "auto trigger". Supporting such an auto trigger may be relatively expensive for a service company that provides the Internet access to users of receiver units. This is so because the receipt of an auto trigger may cause the receiver unit of a viewer to automatically initiate an Internet connection to retrieve web content. If a broadcaster is to broadcast such triggers that cause the service company to incur large Internet costs, it may be desired to have the broadcaster reimburse the service company in some way. The service company may therefore only provide rules that enable the auto triggers of particular authorized broadcasters. If a broadcaster does not provide adequate compensation to a service company, then the service company can prevent the broadcaster from using auto triggers by removing the auto rules from the lists of rules in the receiver units.

If fourth rule 704 does not apply, then processing proceeds to step 806. Because the fourth rule 704 is the last rule in the list, processing proceeds to step 808. The trigger is then handled in accordance with the default trigger handling condition (in this example, the default trigger handling condition is to allow triggers that are not auto triggers).

Accordingly, a receiver unit can be made to have one of many different levels of functionality by tailoring the rules in the list. Receiving units can be made to treat triggers from different broadcasters differently. System reliability can be improved by having receiver units ignore triggers that would otherwise cause failures in the receiver. In some situations, test triggers are broadcast and it is not desired that receiver units of ordinary viewers act on these test triggers. By loading different rules into receiver units involved in the testing from the rules loaded into the receiver units of ordinary users, test triggers can be made to be received and operated on only by the desired receiver units involved in the test. Although the broadcast test triggers are received by the other receiver units, those other receiver units are made to ignore the test triggers.

Although the rules in the example of FIG. 7 have particular fields, it is to be understood that numerous other types of rules for distinguishing some triggers from other triggers are possible in accordance with the invention. Although the method of FIG. 8 parses the rules of the list 700 in sequential top-down order and exists the. list after the finding a rule that applies to the trigger, other methods of determining whether rules apply to triggers are possible.

For example, a rule may contain another field containing the text "CONNECT". If a positive rule containing such a field with the text "CONNECT" is determined to apply to a trigger, then the receiver unit allows the trigger to initiate an Internet connection. If a negative rule containing such a field with the text "CONNECT" is determined to apply to a trigger, then the receiver unit ignores the trigger. Alternatively, the receiver unit can allow the trigger to be processed but the receiver unit prevents the trigger from initiating a connection to the Internet.

Figure 9:
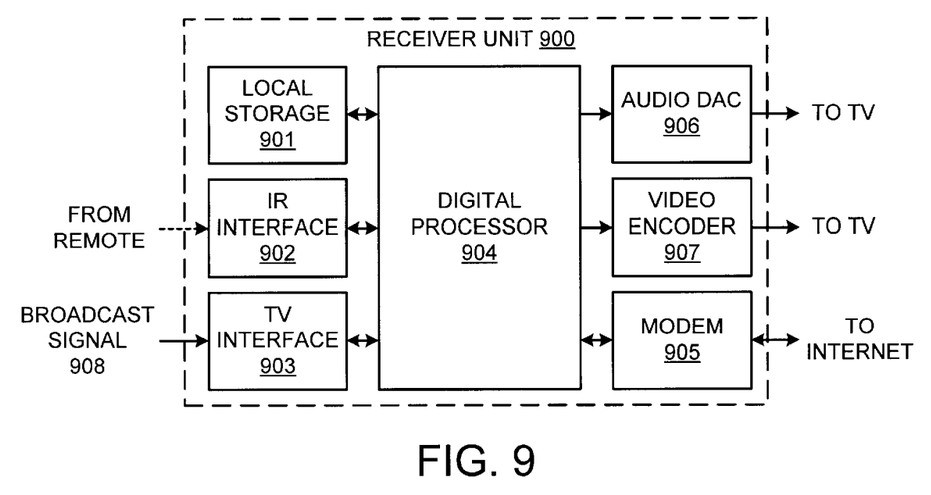
FIG. 9 is a block diagram of one embodiment of a receiver unit in accordance with the present invention.

FIG. 9 is a block diagram of one embodiment of a receiver unit 900 that carries out the method of FIG. 8. Receiver unit 900 is part of an interactive television system similar to system 100. In some embodiments, the receiver unit is integrated into a television set. In other embodiments the receiver unit and the television set are separate devices that are coupled together as illustrated in FIG. 1. In other embodiments, the receiver unit is a part of a computer and the screen on which the television video is displayed connected to the computer.

Receiver unit 900 includes local storage 901, an infrared interface 902 for coupling the receiver unit to a remote control unit, TV interface circuitry 903 that receives a broadcast television signal, a digital processor 904, a modem 905 for coupling the receiver unit 900 to a network (for example, the Internet), an audio digital-to-analog converter 906 and a video encoder 907 for driving an ordinary analog television set. Although receiver unit 900 is coupled to the Internet via modem and an Internet access point, no such coupling is required. All of the triggers, web content, HTML and graphics for an interactive television system can be delivered by embedding them into the broadcast video signal 908.

Figure 10:
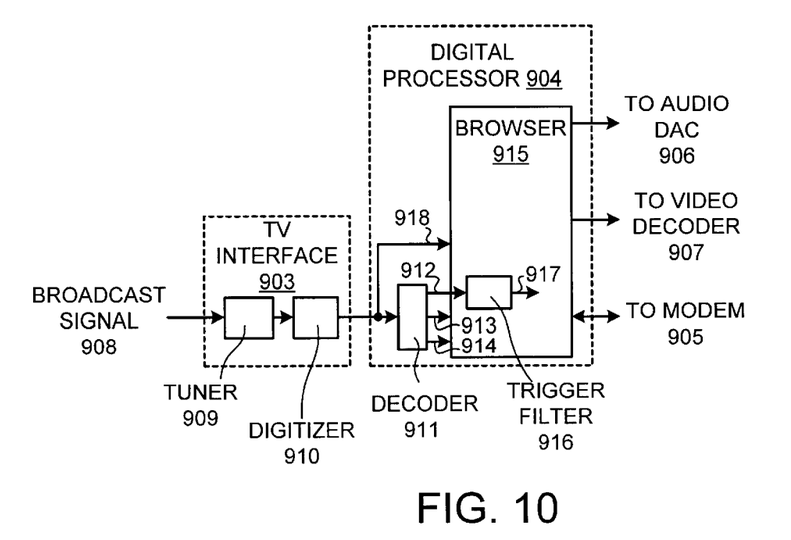
FIG. 10 is a more detailed block diagram of the TV interface circuitry 903 and the digital processor 904 of FIG. 9.

FIG. 10 is a more detailed view of the TV interface circuitry 903 and the digital processor 904 of FIG. 9. A broadcast television signal 908 including interactive television triggers, announcements and data is received onto TV interface circuitry 903. A tuner 909 of the TV interface circuitry 903 is tuned to a broadcast channel containing the broadcast television signal 908 and removes a carrier signal. The resulting signal is then passed to a digitizer 910 of the TV interface circuitry 903. The resulting digitized information 918 is then supplied to digital processor 904. Data decoder software 911 realized by the digital processor 904 parses the digitized information 918 and extracts any triggers, announcements and data that are present. The triggers 912, announcements 913 and associated data 914 are supplied to browser software 915. Software that carries out the method of FIG. 8 is represented as trigger filter block 916. Accordingly, some triggers pass through trigger filter block 916 whereas other triggers do not. The types of triggers that pass through and the types that do not are determined by the rules in the list of rules. The list of rules may, for example, be stored in local storage 901. Triggers 917 that pass through the trigger filter block 916 are generally acted upon in normal fashion by browser software 915. Browser software 915 may, for example, receive a trigger from trigger filter block 916, extract a Uniform Resource Identifier (URI) from the trigger, access the Internet via modem 915 to retrieve web content identified by the URI, merge the retrieved web content and television video together, and then drive the video encoder 907 and audio digital-to-analog converter 906 so that the merged content is displayed on a screen of a television in a fashion determined by the trigger. The URI in this example may be a Uniform Resource Locator (URL) that locates an information resource on the World Wide Web. In an alternate embodiment, the URI can access a file stored locally that includes the web content.

Figure 11:
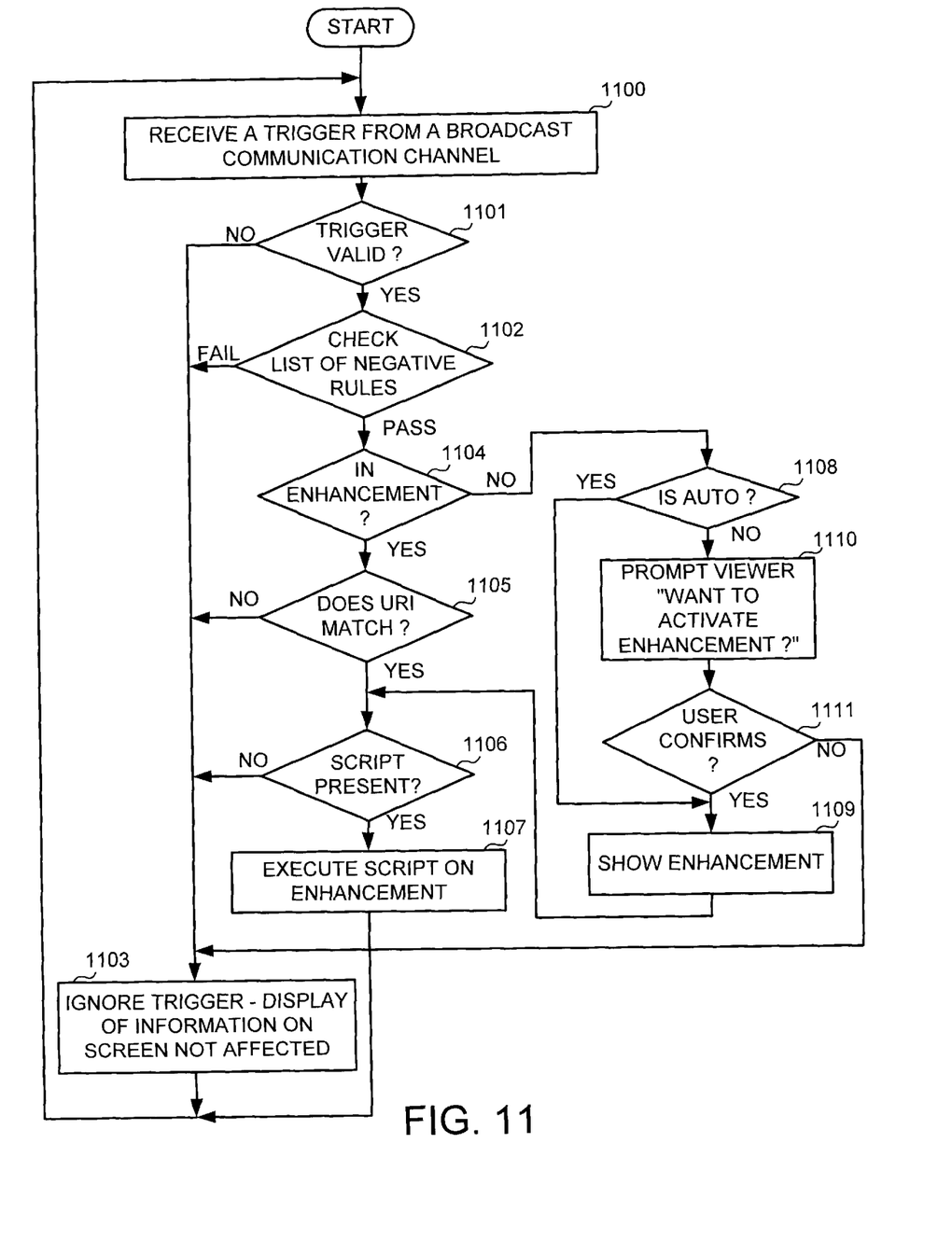
FIG. 11 is a flowchart of a method in accordance with another embodiment.

FIG. 11 is a flowchart of a method in accordance with another embodiment. A trigger is received onto a receiver unit from a broadcast communication channel (step 1100). Next (step 1101), the receiver unit checks the trigger for proper syntax. If the trigger is uncorrupted and has proper syntax, then the receiver unit checks the trigger against a list of negative rules (step 1102) stored in the receiver unit. If any of the negative rules in the list applies, then the check fails and the trigger is ignored (step 1103). If, on the other hand, none of the negative rules applies, then processing proceeds to step 1104 where a determination is made of whether the receiver unit is currently displaying an enhancement. An enhancement may, for example, involve displaying information from a web (HTML or XML) page along with television video. If an enhancement is being displayed, then processing proceeds to step 1105. If a URI in the trigger matches the URI of the enhancement (for example, the URI is a URL and it matches the URL of the HTML or XML web page containing information that is being displayed), then processing proceeds to step 1106. If the trigger contains a script (step 1106), then browser software in the receiver unit executes the script (step 1107) thereby affecting the enhancement.

If, on the other hand, the receiver unit determines in step 1104 that an enhancement is not being displayed, then processing proceeds to step 1108. If the trigger is an "auto trigger", then the browser in the receiver unit acts on the trigger in step 1109. In one example, the receiver unit automatically establishes an Internet connection (for example, using a modem of tile receiver unit), uses the URI of the trigger to retrieve web content identified by the URI, and displays the retrieved web content in a fashion specified by the trigger. The web content identified by the URI can be retrieved from either the broadcast communication channel or the Internet in accordance with techniques set forth in U.S. patent application Ser. No. 09/295,436, entitled "Receiving An Information Resource From The Internet If It Is Not Received From A Broadcast Channel", filed Apr. 20, 1999, by Zigmond et al. (the content of which is incorporated herein by reference).

If, on the other hand, the trigger is not an "auto trigger", then processing proceeds from step 1108 to step 1110 where a prompt appears on the receiver unit screen querying the viewer whether the viewer wishes to view the enhancement. If the viewer confirms that the enhancement is to be viewed (step 1111), then the browser in the receiver unit acts on the trigger in step 1109. If the viewer fails to confirm that the enhancement is to be viewed in step 1111, then processing proceeds to step 1103 and the trigger is ignored.

In the embodiment of FIG. 11, the default trigger handling condition is that auto triggers are enabled. Embodiments are possible, however, where the default trigger handling condition is that auto triggers are disabled. In such an embodiment, a positive rule must be applied in step 1102 in order for an auto trigger to be executed automatically as an auto trigger. If an auto trigger is received and no negative rule applies and no positive rule applies, then the auto trigger is handled in accordance with the default trigger handling condition for auto triggers (i.e., the auto trigger is ignored).

Although the present invention is described in connection with certain specific embodiments for instructional purposes, the present invention is not limited thereto. Different types of triggers that do not affect the display of information on a receiver unit can be distinguished from one another and treated differently using a trigger filter. A browser may include a filter for disabling messages other than triggers. A browser may, for example, include a filter that ignores certain types of announcements and allows of types of announcements. Different types of triggers can be handled in accordance with different default trigger handling conditions such that if no rule applies to a first trigger of a first type then the first trigger is handled in a first way, but if no rule applies to a second trigger of a second type then the second trigger is handled in a second way. The receiver unit may receive broadcast video, triggers, rules, and web content all from a single cable modem connection. The structure of FIG. 9 is but one of many embodiments of a receiver unit that can carry out methods in accordance with the present invention. A receiver unit can, for example, be realized using a computer and a tuner expansion card. Various functions of the receiver unit can be realized in software, in hardware, or both. Software and/or rules for implementing various features of the receiver unit can be stored on a computer-readable medium. Examples of computer-readable mediums include magnetic and optical storage media and semiconductor memory. Triggers can be broadcast over any suitable transport including vertical blanking interval (VBI) line 21 and/or lines 10–20 of an NTSC television signal. Accordingly, various modifications, adaptations, and combinations of various features of the described embodiments can be practiced without departing from the scope of the invention as set forth in the claims.

What is claimed is:

1. In a computer network which is comprised of a plurality of servers and a plurality of interactive television receiver units, and wherein the interactive television receiver units receive at least one broadcast communication channel containing one or more triggers that may be used to access, while viewing the broadcast communication channel, interactive content stored at one or more of the servers on the network, a method for permitting a service company, as opposed to a broadcaster, to control the interactive content that may be accessed by the one or more triggers, the method comprising steps for:

loading into one or more of the interactive television receiver units at least one rule provided from a service company for determining whether a trigger that is included by a broadcaster on a broadcast communication channel is authorized by the service company for accessing interactive content associated with the trigger;

receiving at the one or more interactive television receiver units a communication channel from a broadcaster, the communication channel containing at least one trigger; and based on the at least one rule, determining whether the, at least one trigger is authorized by the service company for permitting access to interactive content.

2. A method as recited in claim 1, further comprising a step for updating the at least one rule at the one or more interactive television receiver units to reflect changes regarding which triggers are authorized by the service company.

3. A method as recited in claim 2, wherein the at least one rule is loaded into a plurality of interactive television receiver units, and wherein the at least one rule is updated at some, but not all, of the plurality of interactive television receiver units.

4. A method as recited in claim 1, wherein the at least one rule permits access to interactive content associated with the at least one trigger, and wherein the method further comprises a step for confirming a viewer's interest in the at least one trigger prior to permitting the display of information associated with the at least one trigger.

5. A method as recited in claim 1, wherein the at least one rule allows the at least one trigger to automatically display information associated with the at least one trigger, the method further comprising acts of:

connecting to the computer network;

retrieving information from one or more servers based on one or more Uniform Resource Identifiers ("URIs") included within the at least one trigger; and displaying the retrieved information.

6. A method as recited in claim 1, wherein the at least one trigger leads to information embedded in a broadcast signal that is received over the at least one broadcast communication channel, and wherein the information is stored locally in at least one interactive television receiver unit.

7. A method as recited in claim 1, wherein the at least one rule comprises string, and wherein the at least one trigger is authorized by the service company only if the at least one trigger contains the string.

8. A method as recited in claim 1, wherein the at least one rule comprises a view attribute, and wherein the at least one trigger is authorized by the service company only if the trigger contains a matching view attribute.

9. A method as recited in claim 1, wherein if the at least one rule is determined to apply to the at least one trigger, then handling the at least one trigger according to a first action associated with the at least one rule, and if no rule applies, then handling the at least one trigger according to a default action associated with the at least one trigger.

10. A method as recited in claim 9, wherein the default action for the at least one trigger, if no rule applies, is to ignore the trigger.

11. A method as recited in claim 9, wherein the default action for the trigger, if no rule applies, is to allow the trigger as authorized.

12. For a computer network which is comprised of a plurality of servers and a plurality of interactive television receiver units, and wherein the interactive television receiver units receive at least one broadcast communication channel containing one or more triggers that may be used to access, while viewing the broadcast communication channel, interactive content stored at one or more of the servers on the network, a computer program product comprising a computer readable medium carrying computer executable instructions that implement a method for permitting a service company, as opposed to a broadcaster, to control the interactive content that may be accessed by the one or more triggers, wherein the method comprises steps for:

loading into one or more of the interactive television receiver units at least one rule provided from a service company for determining whether a trigger that is included by a broadcaster on a broadcast communication channel is authorized by the service company for accessing interactive content associated with the trigger;

receiving at the one or more interactive television receiver units a communication channel from a broadcaster, the communication channel containing at least one trigger; and based on the at least one rule, determining whether the at least one trigger is authorized by the service company for permitting access to interactive content.

13. A computer program product as recited in claim 12, the method further comprising a step for updating the at least one rule at the one or more interactive television receiver units to reflect changes regarding which triggers are authorized by the service company.

14. A computer program product as recited in claim 12, wherein the at least one rule is loaded into a plurality of interactive television receiver units, and wherein the at least one rule is updated at some, but not all, of the plurality of interactive television receiver units.

15. A computer program product as recited in claim 12, wherein the at least one rule permits access to interactive content associated with the at least one trigger, and wherein the method further comprises a step for confirming a viewer's interest in the at least one trigger prior to permitting the display of information associated with the at least one trigger.

16. A computer program product as recited in claim 12, wherein the at least one rule allows the at least one trigger to automatically display information associated with the at least one trigger, the method further comprising acts of:

connecting lo the computer network;

retrieving information from one or more servers based on one or more Uniform Resource Identifiers ("URIs") included within the at least one trigger; and displaying the retrieved information.

17. A computer program product as recited in claim 12, wherein the at least one trigger leads to information embedded in a broadcast signal that is received over the at least one broadcast communication channel, and wherein the information is stored locally in at least one interactive television receiver unit.

18. A computer program product as recited in claim 12, wherein the at least one rule comprises string, and wherein the at least one trigger is authorized by the service company only if the at least one trigger contains the string.

19. A computer program product as recited in claim 12, wherein the at least one rule comprises a view attribute, and wherein the at least one trigger is authorized by the service company only if the trigger contains a matching view attribute.

20. A computer program product as recited in claim 12, wherein if the at least one rule is determined to apply to the at least one trigger, then handling the at least one trigger according to a first action associated with the at least one rule, and if no rule applies, then handling the at least one trigger according to a default action associated with the at least one trigger.

21. A computer program product as recited in claim 20, wherein the default action for the at least one trigger, if no rule applies, is to ignore the trigger.

22. A computer program product as recited in claim 20, wherein the default action for the trigger, if no rule applies, is to allow the trigger as authorized.

23. In a computer network which is comprised of a plurality of servers and a plurality of interactive television receiver units, and wherein the interactive television receiver units receive at least one broadcast communication channel containing one or more triggers that may be used to access, while viewing the broadcast communication channel, interactive content stored at one or more of the servers on the network, a method for permitting a service company, as opposed to a broadcaster, to control the interactive content that may be, accessed by the one or more triggers, the method comprising acts of:

storing into one or more of the interactive television receiver units one or more rules established by a service company for determining whether a trigger that is included by a broadcaster on a broadcast communication channel is authorized by the service company for accessing interactive content associated with the trigger;

tuning the interactive television receiver unit to a communication channel from the broadcaster, the communication channel containing at least one trigger; and applying the one or more rules to determine whether the at least one trigger is authorized by the service company for permitting access to interactive content.

24. A method as recited in claim 23, wherein the one or more rules are updated to reflect changes regarding which triggers are authorized by the service company, the method further comprising acts of:

establishing communication with a source of one or more updated rules, by either (i) tuning the interactive television receiver unit to an appropriate broadcast communication channel, or (ii) connecting to the source over the computer network and requesting the one or more updated rules; and replacing the one or more rules with the one or more updated rules.

25. A method as recited in claim 23, wherein the one or more rules permit access to interactive content associated with the at least one trigger, and wherein a viewer's interest in the at least one trigger is confirmed prior to permitting the display of information associated with the at least one trigger, the method further comprising acts of:

displaying a prompt corresponding to the at least one trigger; and if a viewer responds to the prompt within a particular time frame, displaying information associated with the at least one trigger, and otherwise, removing the prompt from display.

26. A method as recited in claim 23, wherein the at least one trigger leads to information embedded in a broadcast signal that is received over the at least one broadcast communication channel, and wherein the information is stored locally in at least one interactive television receiver unit.

27. A method as recited in claim 23, wherein the one or more rules comprise a string, and wherein the at least one trigger is authorized by the service company only if the at least one trigger contains the string.

28. A method as recited in claim 23, wherein the one or more rules comprise a view attribute, and wherein the at least one trigger is authorized by the service company only if the trigger contains a matching view attribute.

29. A method as recited in claim 23, wherein if the at least one rule is determined to apply to the at least one trigger, then processing the at least one trigger according to a first action associated with the at least one rule, and if no rule applies, then processing the at least one trigger according to a default action associated with the at least one trigger.

30. A method as recited in claim 29, wherein the default action for the at least one trigger, if no rule applies, is to ignore the trigger.

31. A method as recited in claim 29, wherein the default action for the trigger, if no rule applies, is to allow the trigger as authorized.

32. For a computer network which is comprised of a plurality of servers and a plurality of interactive television receiver units, and wherein the interactive television receiver units receive at least one broadcast communication channel containing one or more triggers that may be used to access, while viewing the broadcast communication channel, interactive content stored at one or more of the servers on the network, a computer program product comprising a computer readable medium carrying computer executable instructions that implement a method for permitting a service company, as opposed to a broadcaster, to control the interactive content that may be accessed by the one or more triggers, wherein the method comprises acts of:

storing into one or more of the interactive television receiver units one or more rules established by a service company for determining whether a trigger that is included by a broadcaster on a broadcast communication channel is authorized by the service company for accessing interactive content associated with the trigger;

tuning the interactive television receiver unit to a communication channel from the broadcaster, the communication channel containing at least one trigger; and applying the one or more rules to determine whether the at least one trigger is authorized by the service company for permitting access to interactive content.

33. A computer program product as recited in claim 32, wherein the one or more rules are updated to reflect changes regarding which triggers are authorized by the service company, the method further comprising acts of:

establishing communication with a source of one or more updated rules, by either (i) tuning the interactive television receiver unit to an appropriate broadcast communication channel, or (ii) connecting to the source over the, computer network and requesting the one or more updated rules; and replacing the one or more rules with the one or more updated rules.

34. A computer program product as recited in claim 32, wherein the one or more rules permit access to interactive content associated with the at least one trigger, and wherein a viewer's interest in the at least one trigger is confirmed prior to permitting the display of information associated with the at least one trigger, the method further comprising acts of:

displaying a prompt corresponding to the at least one trigger; and if a viewer responds to the prompt within a particular time frame, displaying information associated with the at least one trigger, and otherwise, removing the prompt from display.

35. A computer program product as recited in claim 32, wherein the at least one trigger leads to information embedded in a broadcast signal that is received over the at least one broadcast communication channel, and wherein the information is stored locally in at least one interactive television receiver unit.

36. A computer program product as recited in claim 32, wherein the one or more rules comprise a string, and wherein the at least one trigger is authorized by the service company only if the at least one trigger contains the string.

37. A computer program product as recited in claim 32, wherein the one or more rules comprise a view attribute, and wherein the at least one trigger is authorized by the service company only if the trigger contains a matching view attribute.

38. A computer program product as recited in claim 32, wherein if the at least one rule is determined to apply to the at least one trigger, then processing the at least one trigger according to a first action associated with the at least one rule, and if no rule applies, then processing the at least one trigger according to a default action associated with the at least one trigger.

39. A computer program product as recited in claim 38, wherein the default action for the at least one trigger, if no rule applies, is to ignore the trigger.

40. A computer program product as recited in claim 38, wherein the default action for the trigger, if no rule applies, is to allow the trigger as authorized.

* * * * *

UNITED STATES PATENT AND TRADEMARK OFFICE
CERTIFICATE OF CORRECTION

PATENT NO.    : 6,460,180 B1
DATED         : October 1, 2002
INVENTOR(S)   : Timothy F. Park, Dean J. Blackketter and Sandra R. Bernardi It is certified that error appears in the above-identified patent and that said Letters Patent is hereby corrected as shown below:

Column 3,
Line 34, before "is" delete "that"

Column 5,
Line 13, after "of" insert -- a --

Column 7,
Line 25, after "exists" change "the." to -- the --

Column 9,
Line 29, after "allows" change "of" to -- other --

Column 10,
Line 10, after "whether" change "the," to -- the --

Column 11,
Line 45, after "connecting" change "lo" to -- to --

Column 12,
Line 21, after "may" change "be," to -- be --

Column 14,
Line 3, before "computer" change "the," to -- the --

Signed and Sealed this

Twenty-sixth Day of August, 2003

JAMES E. ROGAN
*Director of the United States Patent and Trademark Office*